US008177502B2

(12) United States Patent
Headley et al.

(10) Patent No.: US 8,177,502 B2
(45) Date of Patent: May 15, 2012

(54) VANE WITH REDUCED STRESS

(75) Inventors: Mitchell Jay Headley, Lebanon, OH (US); Stephen Joseph Gruber, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 662 days.

(21) Appl. No.: 12/277,787

(22) Filed: Nov. 25, 2008

(65) Prior Publication Data

US 2010/0129210 A1 May 27, 2010

(51) Int. Cl.
*F01D 9/04* (2006.01)
(52) U.S. Cl. ................ 415/209.3
(58) Field of Classification Search .......... 415/209.3, 415/208.1, 133, 173.4, 139; 416/219 R
See application file for complete search history.

(56) References Cited

U.S. PATENT DOCUMENTS

| | | | |
|---|---|---|---|
| 3,881,844 A * | 5/1975 | Hennessey et al. | 416/145 |
| 4,452,564 A * | 6/1984 | Conant et al. | 415/9 |
| 4,497,612 A * | 2/1985 | Knorowski et al. | 416/198 A |
| 5,022,818 A * | 6/1991 | Scalzo | 415/209.3 |
| 5,332,360 A | 7/1994 | Correia et al. | |
| 5,462,403 A | 10/1995 | Pannone | |
| 5,846,050 A | 12/1998 | Schilling | |
| 6,183,202 B1 * | 2/2001 | Ganshaw | 416/219 R |
| 6,649,887 B2 | 11/2003 | Budinger | |
| 6,860,721 B2 * | 3/2005 | Knott et al. | 416/219 R |
| 7,147,434 B2 * | 12/2006 | Mons et al. | 415/200 |
| 7,293,957 B2 * | 11/2007 | Ellis et al. | 415/135 |

* cited by examiner

*Primary Examiner* — Alexander Gilman
(74) *Attorney, Agent, or Firm* — General Electric Company; Matthew P. Hayden

(57) ABSTRACT

An airfoil assembly is described comprising an airfoil, a band coupled to the airfoil for providing at least a portion of support for the airfoil in the airfoil assembly and a slot capable reducing stress in the airfoil wherein the slot is located in the band near a portion of the airfoil. A compression system is described comprising a stator assembly comprising a plurality of arcuate vane sectors arranged circumferentially around a longitudinal axis, each vane sector comprising an airfoil, an arcuate inner band and an arcuate outer band coupled to the airfoil, and a slot capable of reducing stress in the airfoil, the slot being located in the vane sector near a portion of the airfoil.

23 Claims, 7 Drawing Sheets

VANE WITH REDUCED STRESS

BACKGROUND OF THE INVENTION

This invention relates generally to compressors, and more specifically to blades and vanes used in compression systems. As used herein, the term "fluid" includes gases and liquids.

In a gas turbine engine, air is pressurized in a compression module during operation. The air channeled through the compression module is mixed with fuel in a combustor and ignited, generating hot combustion gases which flow through turbine stages that extract energy therefrom for powering the fan and compressor rotors and generate engine thrust to propel an aircraft in flight or to power a load, such as an electrical generator.

The compressor includes a rotor assembly and a stator assembly. The rotor assembly includes a plurality of rotor blades extending radially outward from a disk. More specifically, each rotor blade extends radially between a platform adjacent the disk, to a tip. A gas flowpath through the rotor assembly is bound radially inward by the rotor blade platforms, and radially outward by a plurality of shrouds.

The stator assembly includes a plurality of circumferentially spaced apart stator vanes or airfoils that direct the compressed gas entering the compressor to the rotor blades. The stator vanes extend radially between an inner band and an outer band. A gas flowpath through the stator assembly is bound radially inward by the inner bands, and radially outward by outer bands. The vanes are typically made in arcuate segments with arcuate outer and inner band segments each having one or more vane airfoils per segment. The segments are conventionally joined together to collectively form a complete 360 Degree stator vane stage. The stator vane segements are mounted within a compressor casing. A vane stage comprises a plurality of circumferentially arranged vane segments, with each segment having a plurality of vane airfoils extending between an arcuate inner band and an arcuate outer band.

In some designs, the vane segments are supported solely at its outer band since a conventional annular seal member is disposed between rotor stages, preventing stationary support of the inner band as well. Accordingly, the vane airfoils in these vane segments are cantilevered from the outer band support which creates bending moments due to the fluid flowing between the vanes which must be suitably reacted or accommodated through the outer band. The bending moments in some of these airfoils may be significant since they are supported solely at their outer band, with the inner band thereof being unsupported.

During engine operation, the gas flow through the flow path induces mechanical, thermal, and aerodynamic loads on the airfoils. Some of these loads are transmitted by the airfoils to support structures in the engine through the outer bands that are coupled to the airfoil and reacted by the support structures. In some designs, the inner bands may also, similarly, transmit some of the loads applied on the airfoils by the gas flow and reacted by other support structures. Within at least some conventional gas turbine engines, the stresses in the airfoil near the interface with outer band and near the support structures may become large enough to cause distress in the airfoil. Under sufficiently large stresses, cracking may occur in the airfoils within the vane sector near support structure locations that react the loading applied to the vane airfoils in the vane sector by the gas flow. Designing with additional thickness at these high locations may not be possible for several reasons, such as, aerodynamic considerations, flow modifications, additional weight and changed dynamic characteristics of the vanes and/or excessive leakages in the vane sectors.

Accordingly, it is would be desirable to have an airfoil assembly having features that reduce the stresses in the airfoil near the interface with the bands that support the airfoil while minimizing leakages in the vane sector. It would be desirable to have a method of manufacturing an airfoil assembly having features that reduce the stresses in the airfoil and having an interface with the bands that support the airfoil.

BRIEF DESCRIPTION OF THE INVENTION

The above-mentioned needs may be met by exemplary embodiments which provide an airfoil assembly comprising an airfoil, a band coupled to the airfoil for providing at least a portion of support for the airfoil in the airfoil assembly and a slot capable reducing stress in the airfoil wherein the slot is located in the band near a portion of the airfoil.

In another aspect of the present invention, a compression system comprises a stator assembly comprising a plurality of arcuate vane sectors arranged circumferentially around a longitudinal axis, each vane sector comprising an airfoil, an arcuate inner band and an arcuate outer band coupled to the airfoil, and a slot capable of reducing stress in the airfoil, the slot being located in the vane sector near a portion of the airfoil.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
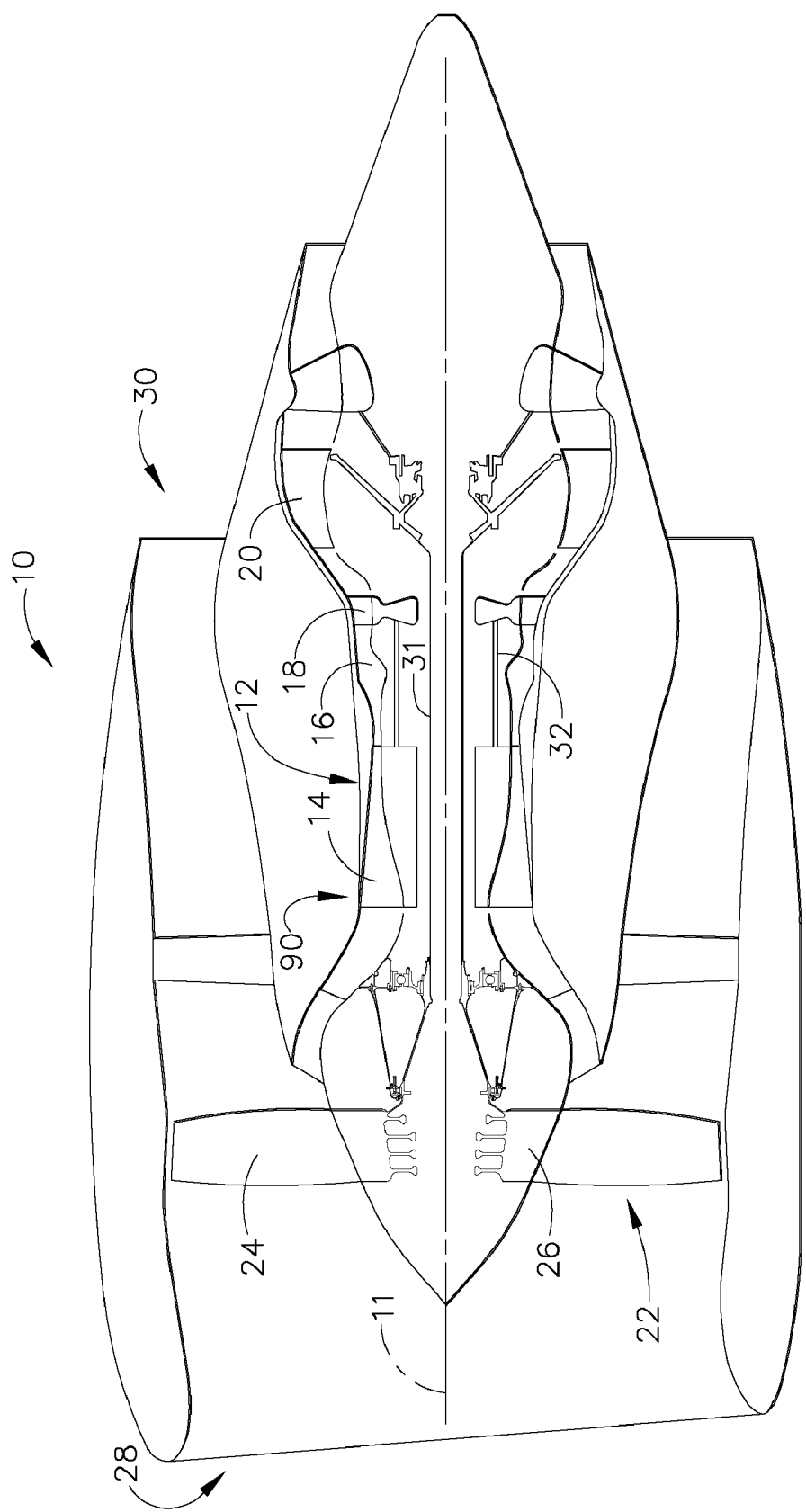
FIG. 1 is a cross-sectional view of an exemplary gas turbine engine assembly comprising a compression system according to an exemplary embodiment of the present invention.

Referring to the drawings wherein identical reference numerals denote the same elements throughout the various views, FIG. 1 shows a cross-sectional view of a gas turbine engine assembly 10 having a longitudinal axis 11. The gas turbine engine assembly 10 includes a core gas turbine engine 12 that includes a high-pressure compressor 14, a combustor 16, and a high-pressure turbine 18. In the exemplary embodiment shown in FIG. 1, the gas turbine engine assembly 10 also includes a low-pressure turbine 20 that is coupled axially downstream from core gas turbine engine 12, and a fan assembly 22 that is coupled axially upstream from core gas turbine engine 12. Fan assembly 22 includes an array of fan blades 24 that extend radially outward from a rotor disk 26. In the exemplary embodiment shown in FIG. 1, engine 10 has an intake side 28 and an exhaust side 30. In the exemplary embodiment, gas turbine engine assembly 10 is a turbofan gas turbine engine that is available from General Electric Company, Cincinnati, Ohio. Core gas turbine engine 12, fan assembly 22, and low-pressure turbine 20 are coupled together by a first rotor shaft 31, and compressor 14 and high-pressure turbine 18 are coupled together by a second rotor shaft 32.

In operation, air flows through fan assembly blades 24 and compressed air is supplied to a compression system 90 that includes a high-pressure compressor 14. The air discharged from fan assembly 22 is channeled to compressor 14 wherein the airflow is further compressed and channeled to combustor 16. Products of combustion from combustor 16 are utilized to drive turbines 18 and 20, and turbine 20 drives fan assembly 22 via shaft 31. Engine 10 is operable at a range of operating conditions between design operating conditions and off-design operating conditions.

Figure 2:
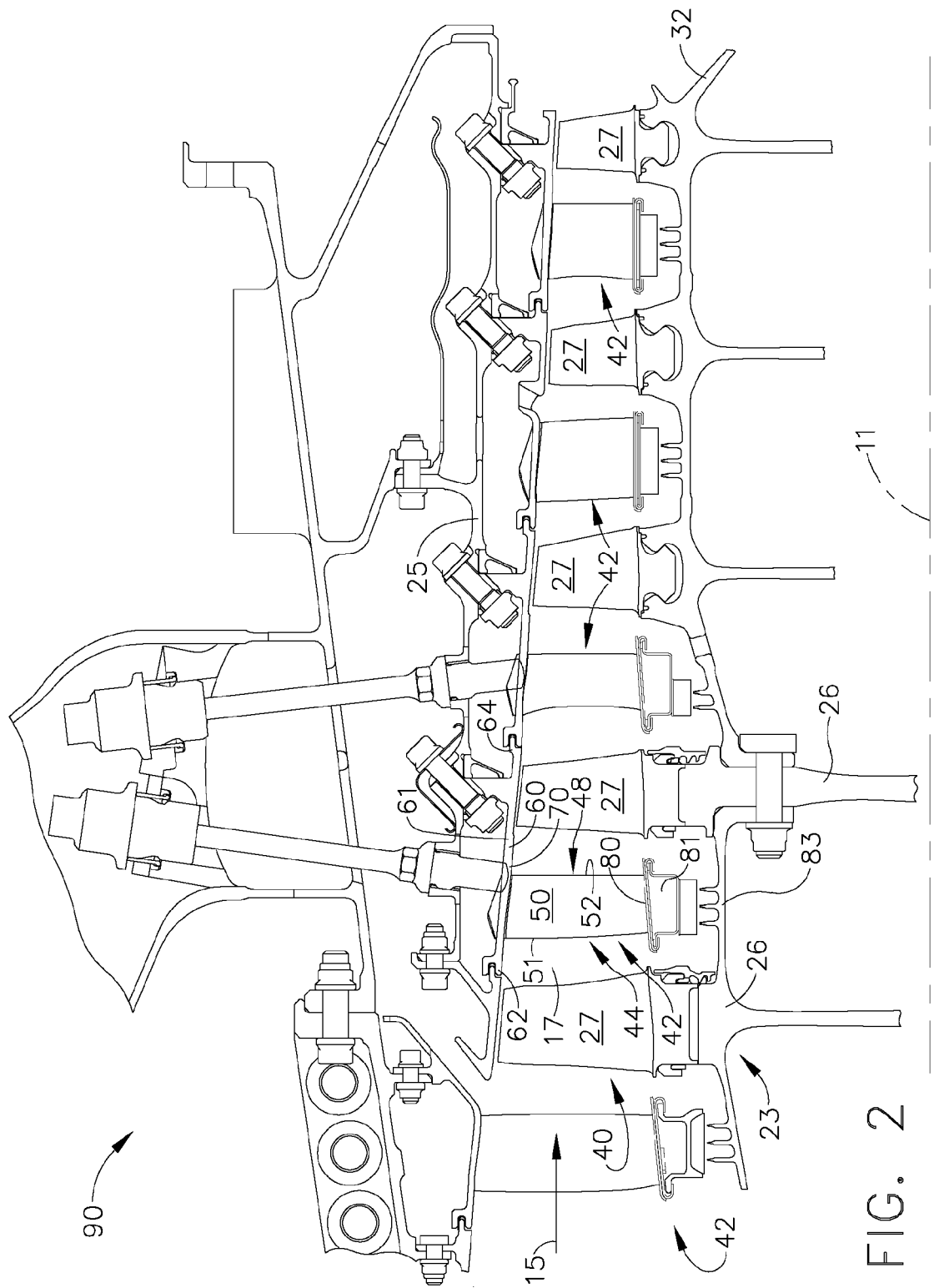
FIG. 2 is an axial cross-sectional view of a portion of a compression system having an airfoil assembly according to an exemplary embodiment of the present invention.

FIG. 2 is an axial cross-sectional view of a portion of the compression system 90 having a high-pressure compressor 14 including an exemplary embodiment of an airfoil assembly 48 according to an exemplary embodiment of the present invention. Core airflow, shown as item 15 in FIG. 2, flows in the annular flow path 17 of the compression system 90. The compression system 90 includes a plurality of compression stages 40 wherein each stage 40 includes a row of circumferentially spaced rotor blades 27 and a stator assembly 42. The stator assembly 42 includes a row of circumferentially spaced arcuate stator vane sectors 44 that are arranged circumferentially around the longitudinal axis 11. Each stator vane sector 44 comprises a vane airfoil 50 coupled to a band 61 that supports the airfoil 50. In the exemplary embodiment shown in FIG. 2, the vane airfoil 50 is coupled to an arcuate outer band 60 located near the radially outer portion of the airfoil 50, and an arcuate inner band 80 located at the radially inner portion of the airfoil 50, referred to herein with respect to the longitudinal axis 11.

In the exemplary embodiment shown in FIG. 2, the airfoil 50 is supported only at the outer band 50 wherein the inner band 80 supports a seal 81 which interfaces with a conventional annular seal 83 located between two adjacent rotors. Conventional sealing shrouds or segments 81 are suitably attached to the radially inner bands 80 of the vane sectors 44 to cooperate with labyrinth teeth extending from annular seal 83 of the compressor rotor for effecting interstage seals. In this configuration, the individual vane sectors 44 are mounted to the outer casing 25 solely by their outer bands, with the vane airfoils 50 and inner bands 80 being suspended therefrom. The vane sector 44 comprises a contoured slot 70 (see FIG. 3), located in the outer band 60, capable of reducing a stress in the airfoil 50 and lowering leakages, as described subsequently herein. The compression system 90 further comprises a compressor rotor 23 having rotor blades 27 typically supported by rotor disks 26, and are coupled to rotor shaft 32.

The compression system 90 further comprises a casing 25 that surrounds the compressor 14 and supports the vane sectors 44 in the stator assemblies 42. Each vane sector 44 comprises an arcuate forward rail 62 located axially forward from the airfoil 50, and an arcuate aft rail 64 located axially aft from the airfoil 50, that engage with a corresponding rails in adjacent components or the casing 25. The loads that are experienced by each vane sector 44 are reacted with the support structures in the casing 25 through lugs 34, 35, 36 (see FIG. 3) located on each vane sector 44. During assembly, the individual vane sectors 44 are axially inserted into respective ones of the casing halves by engaging the forward and aft rails 62, 64 with the corresponding forward and aft grooves in the support structures or adjacent components. In the exemplary embodiment shown in FIG. 2, there are 10 arcuate vane sectors 44, each having an arcuate sector angle of 36 degrees. Each vane segment or sector 44 is slid circumferentially in turn into the casing slot until all of the vane sectors in each casing half are assembled. The two casing halves are then assembled together so that the vane sectors 44 in each casing slot define a respective annular row of adjoining vane sectors 44 for each compression stage 40.

Figure 3:
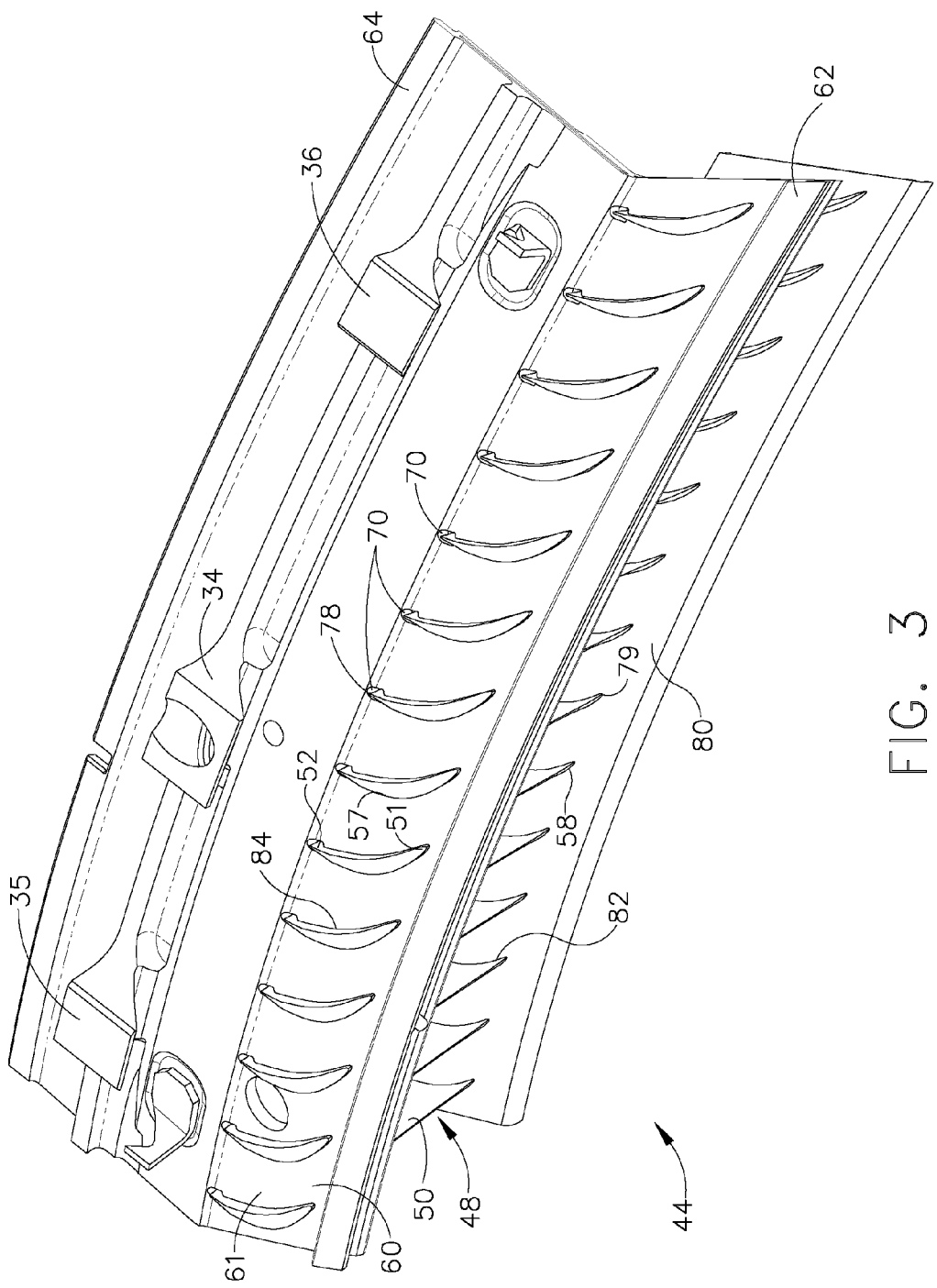
FIG. 3 is a perspective view of an airfoil assembly according an exemplary embodiment of the present invention.

FIG. 3 shows a vane sector 44 having an exemplary embodiment of the present invention of an airfoil assembly 48 comprising a plurality of airfoils 50 supported by a band 61. In the exemplary embodiment shown in FIG. 3, the airfoil assembly has fourteen airfoils 50 arranged in a circumferential row and supported by an arcuate outer band 60 and an arcuate inner band 80. The arcuate vane sector 44 shown in FIG. 3 has a sector angle of 36 degrees. In alternate embodiments, the airfoil assembly may have a different number of airfoils and may be supported at only one end of the airfoil 50, by an outer band 60 or by an inner band 80. The vane sector 44 has a forward rail 62 located at an axially forward end, and an aft rail 64 located at an axially aft end of the vane sector 44. The fwd rail 62 and aft 64 have an arcuate shape and engage with adjacent components as shown in FIG. 2 to provide a portion of the support for the vane sector 44. The mechanical, thermal and aerodynamic loads and moments from the airfoil assembly 48 are transmitted to the outer band 61 and these loads are reacted with the support structures, such as, for example, casing 25 (See FIG. 2) through support lugs. In the exemplary embodiment shown in FIG. 3, three support lugs are used, a first-end lug 35, a second-end lug 36 and a center lug 34. These support lugs 34, 35, 36 engage with the support structures, such as the casing 25, and react the loads and moments from the airfoil assembly 50. The airfoil 50, outer band 60 and inner band 80 may be made from a known material, such as, for example, Titanium alloys, Nickel and Cobalt based alloys. In the exemplary embodiment shown in FIG. 3, the airfoil 50 is made from Inconel 718, the outer band 60 is made from Inconel 718 and the inner band 80 is made from Inconel 625. The airfoil 50, outer band 60 and inner band 80 are made by a known processes, such as for example, casting, forging or forming.

The mechanical, aerodynamic and thermal loads experienced by the individual airfoils 50 in the airfoil assembly 48 create stresses in the airfoils 50. The peak stresses experienced by individual airfoils 50 in the vane sector 44 are not usually the same. Conventional analysis using known analytical methods has shown that the peak stresses in each airfoil 50 varies, depending on the circumferential location of the airfoil 50 the array and its location with respect to the support lugs 34, 35, 36. Peak stress variations in the airfoils may be as high as 25%. Further, it has been seen that, the peak stress occurs in each airfoil 50 at the trailing edge, near the interface with the supporting band 61, such as the outer band 60. Full sector analysis of a conventional vane sector using known finite element analytical methods has confirmed that high mean stresses occur in the airfoils located in the center of the sector at the airfoil trailing edge near the interface with the outer band. To meet aerodynamic requirements in compression systems, airfoils 50 are relatively thin at the leading edge 51 and the trailing edge 52, and peak stresses are preferably to be avoided at these locations to prevent cracking.

In the exemplary embodiment of the present invention shown in FIGS. 3-6, peak stress at the airfoil 50 trailing edge 62 at the interface with the outer band 60 is eliminated by removing the load path through the trailing edge 52 into the outer band 60. This is accomplished by having a slot 70 in the outer band 60 near the trailing edge 52. Cutting the load path at the thin trailing edge 52 of the airfoil 50 forces the airfoil loads and moments to be reacted further forward towards the middle of the airfoil 50 where the airfoil thickness is greater, thereby reducing peak stresses. Full sector analysis, using known finite element methods, of the exemplary embodiment of the present invention shown in FIGS. 3-6 having a slot 70 in the outer band 60 near each airfoil 50 trailing edge 52 has confirmed that the peak stresses in each airfoil 50 is reduced by about between 35% and 45%. Such large reductions in peak stresses in airfoils significantly reduce the possibility of any cracking at the trailing edges and improves the durability of the vanes. It will be apparent to those skilled in the art that, in other embodiments of the present invention, similar approach of having a slot, such as slot 70 in FIGS. 3-6, may also be used near the leading edge 51 of the airfoil 50, and the slot 70 may be located on the outer band 60, inner band 80 or both. These and other modifications in implementation are within the scope of the present invention.

Figure 4:
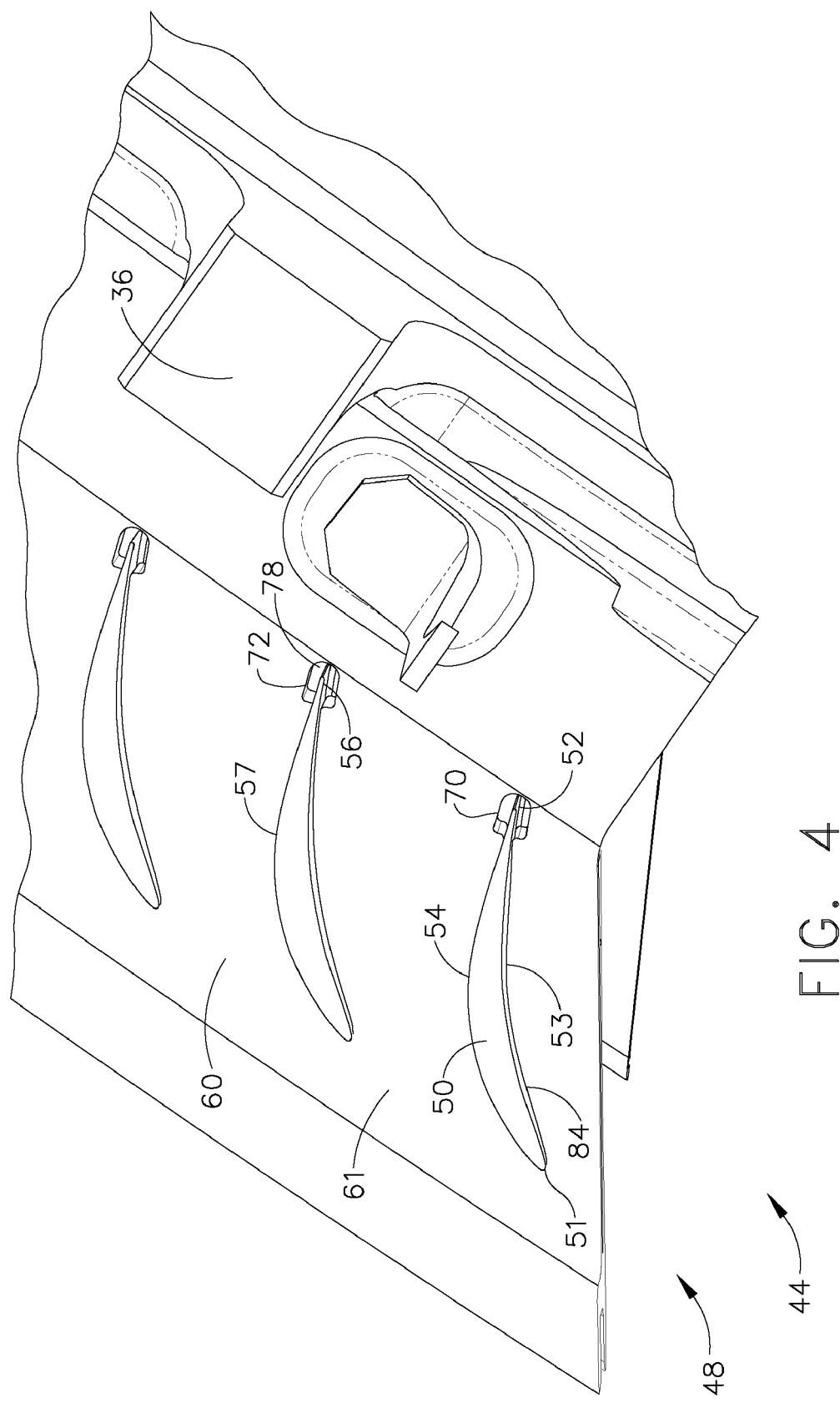
FIG. 4 is a perspective view (looking radially inward) of a portion of the exemplary airfoil assembly shown in FIG. 3.
Figure 5:
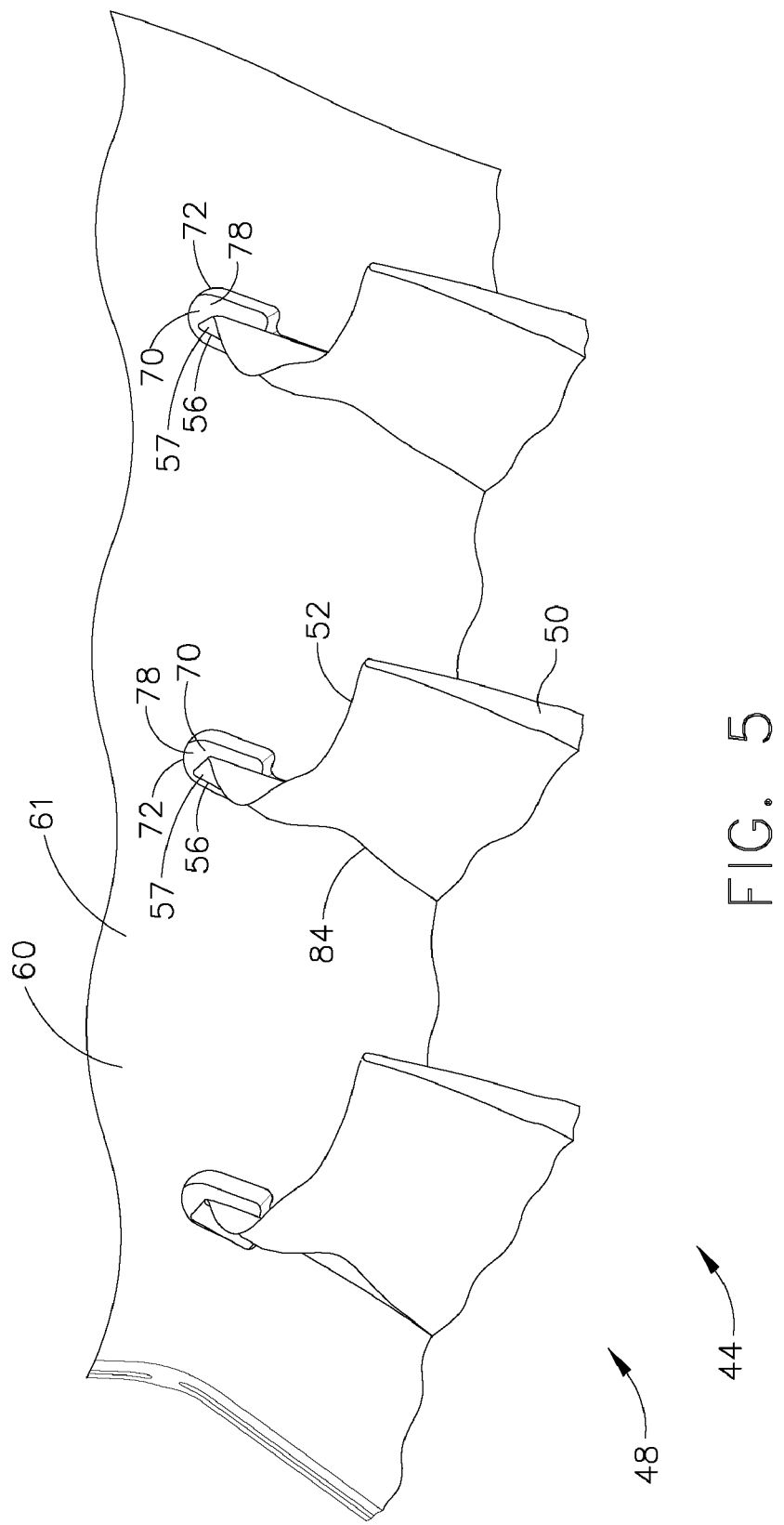
FIG. 5 is a perspective view (looking radially outward) of a portion of the exemplary airfoil assembly shown in FIG. 3.
Figure 6:
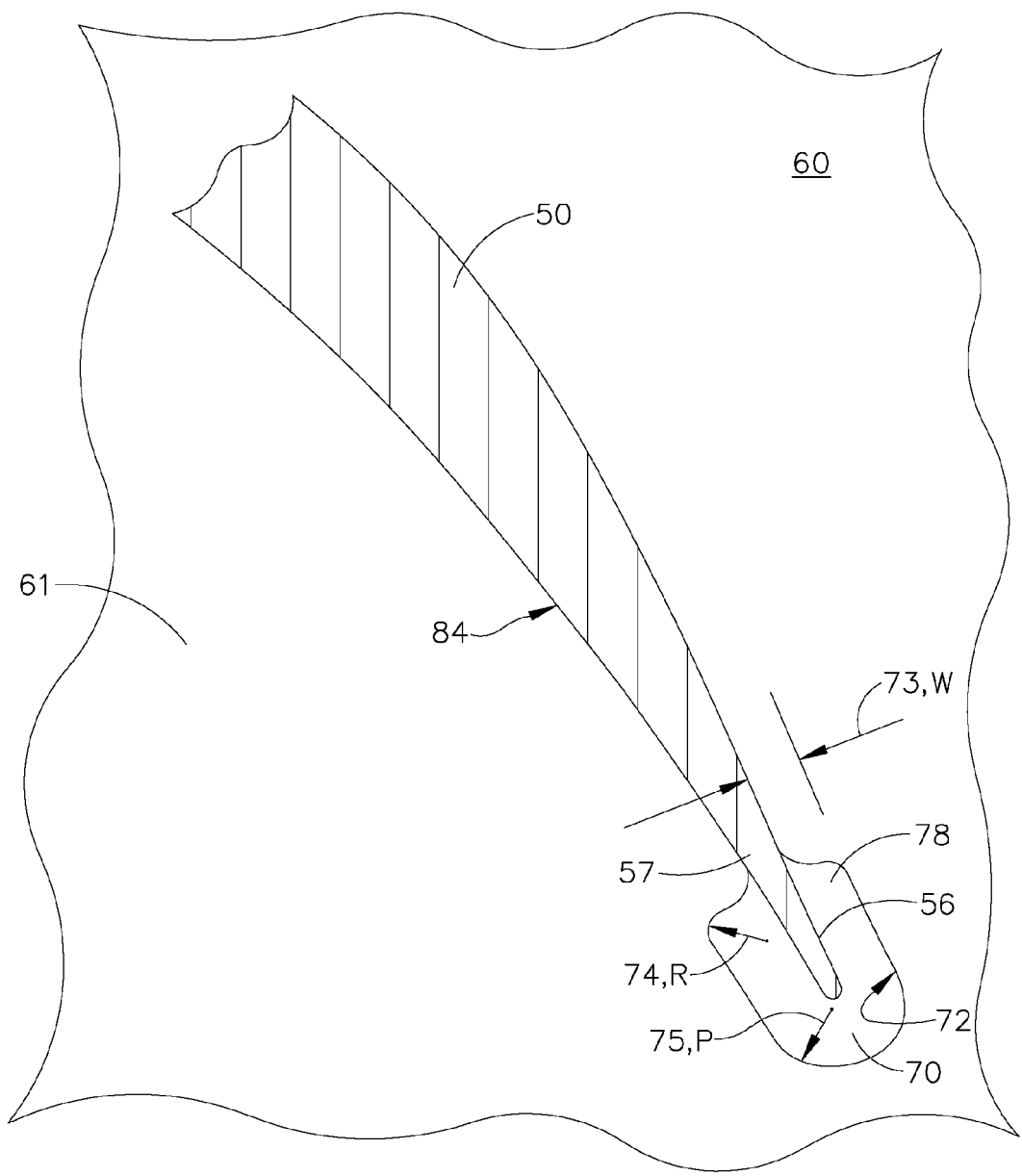
FIG. 6 is a schematic view of an exemplary slot in the outer band near the trailing edge of an airfoil in an airfoil assembly according to an exemplary embodiment of the present invention.

It will be appreciated that the fluid flowing through the flow path 17 has a relatively higher pressure, and there will be some leakage of that fluid through the slot 70. In another aspect of the present invention, fluid leakage from the flow path 17 through the slot 70 in the band 61 is minimized. This is accomplished by having a slot-contour shape 72 for the slot 70 that generally corresponds to the airfoil-contour shape 56 of the airfoil near the location of the slot, as shown in FIGS. 4-6. FIG. 4 is a perspective view looking radially inward, and FIG. 5 is a perspective view looking radially outward, of a portion of the exemplary embodiment of the present invention of airfoil assembly 48 shown in FIG. 3.

Referring to FIG. 6, the geometry of a slot 70 according to an exemplary embodiment of the present invention is described. The airfoil 50 has a first end 57 (see FIGS. 2, 6) which extends through a first aperture 78 in the outer band 60. The first aperture corresponds generally to the shape of the airfoil 50 at its first end 57, and further comprises a slot 70 near an airfoil edge, such as, for example, the trailing edge 56. There is a small braze gap (not shown) between the first aperture 78 and the airfoil 50 that is later filled by braze material during manufacturing described subsequently herein. The braze gap is typically in the range of between about 0.000 inches and 0.010 inches. In one aspect of the present invention, the slot-contour shape 72 is designed to generally correspond to the airfoil edge contour 56 thereby minimizing leakage of fluid through the slot 70. For example, as shown in FIG. 6, the slot-contour has a radius 'P' (item 75) that locates the slot from the airfoil edge. Further, the slot-contour 72 extends along the chordal direction of the airfoil and transitions with a radius 'R' (item 74) to the first aperture 78 near the airfoil. The resulting slot-contour shape 72 has a width 'W' (item 73) from the airfoil surface. It has been found that such a contour minimizes the fluid leakage from the flow path and also reduces the airfoil peak stresses by eliminating the load path at the airfoil edges. In the preferred embodiment of the present invention, the radius 'P' (item 75) has a value of about 0.046 inches, radius 'R' (item 74) has a value of about 0.015 inches, and the width 'W' (item 73) has a value of about 0.040 inches. It has been found that the slot 70 having a slot-contour shape 72 as described above has a 32% reduction in the recirculation flow leakage area as compared to a simple circular hole, and effecting a significant reduction in fluid leakage through the slot 70. It will be apparent to those skilled in the art that, in other embodiments of the present invention, it is possible to have other variations or modifications in the slot-contour geometry described above. For example, it may be possible to have an offset for the slot-contour 72 with respect to the airfoil-contour shape 56. These and other modifications in the contour geometries and shapes are within the scope of the present invention.

Figure 7:
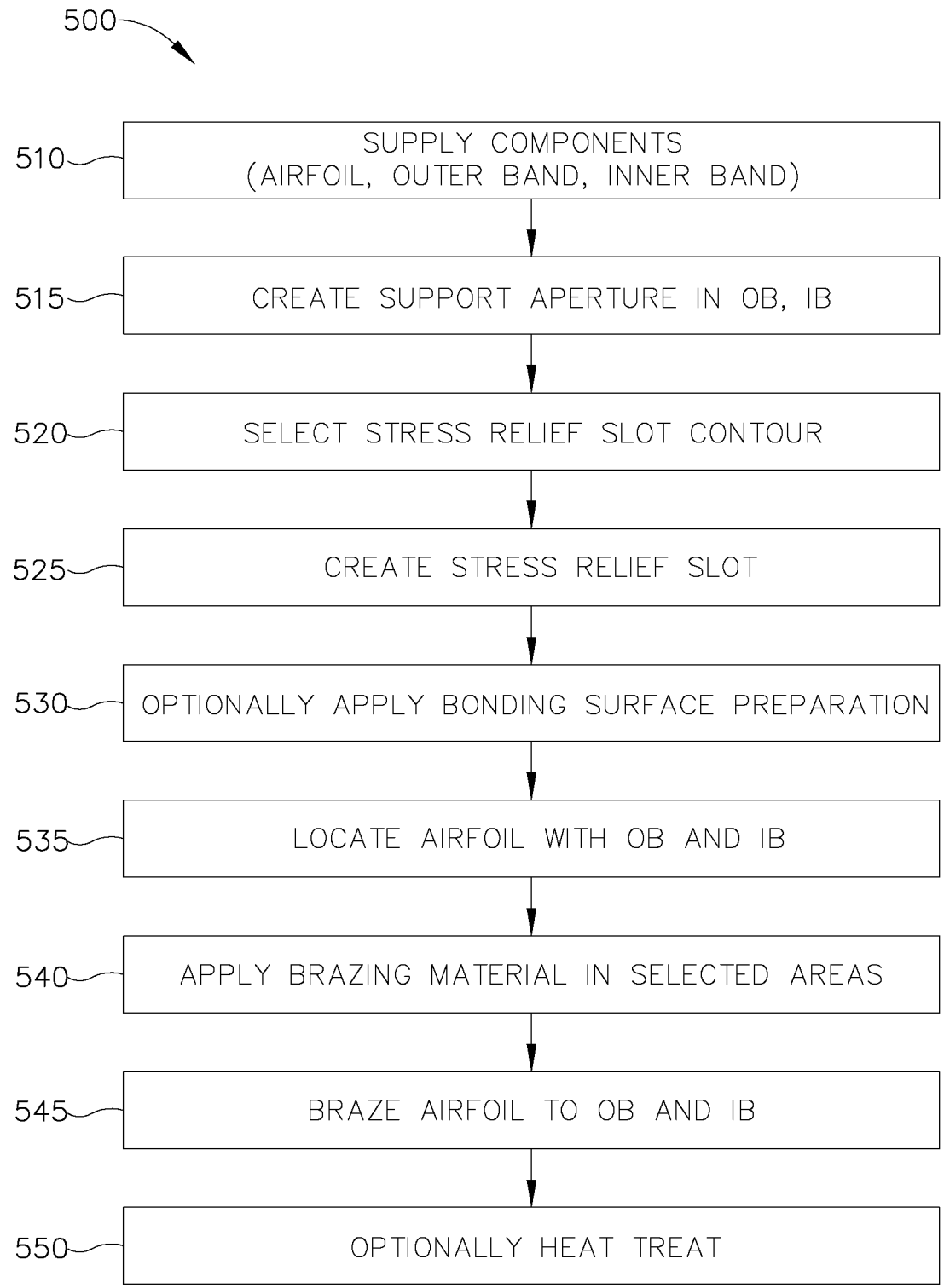
FIG. 7 is a flow chart showing an exemplary embodiment of a method of manufacturing an airfoil assembly.

FIG. 7 shows a flow chart schematically showing an exemplary embodiment of a method 500 for manufacturing an airfoil assembly 48 such as, for example, shown in FIG. 3. The method 500 comprises the step 510 of supplying the components, such as for example, a band 61 and an airfoil 50. In some applications, the components may comprise a plurality of airfoils 50, an outer band 60 and an inner band 80. The airfoil 50, outer band 60 and inner band 80 may be made from a known material, such as, for example, Titanium alloys, Nickel and Cobalt based alloys. In the exemplary embodiment shown in FIG. 3, the airfoil 50 is made from Inconel 718, the outer band 60 is made from Inconel 718 and the inner band 80 is made from Inconel 625. The airfoil 50, outer band 60 and inner band 80 are made by a known processes, such as for example, casting, forging or forming.

The method 500 further comprises the step 515 of creating a first aperture 78 in the outer band 60 that is capable of receiving a portion of the airfoil 50. The aperture 78 has a contour that corresponds with the contour of the portion of the airfoil 50 that will extend through it during assembly as described herein. For example, in the exemplary embodiment shown in FIG. 3, the aperture 78 has an airfoil shaped contour that corresponds with the first end 57 of the airfoil 50. The aperture 78 is slightly larger than the airfoil first end 57 such that it has a small gap between the airfoil 50 and the outer band 60 for receiving a braze material. This braze gap is preferably between 0.000 inches and 0.010 inches. The aperture 78 can be created in the outer band 60 using known methods, such as by laser machining and electro discharge machining (EDM).

The method 500 further comprises the step 525 of creating a slot 70 in the outer band 60 for reducing stress in the airfoil 50 during operation of the airfoil assembly 48. The location and contour shape of the slot 70 is selected based on stress analysis of the airfoil assembly 50 using known analytical methods. An exemplary embodiment of the slot 70 is shown in FIGS. 3-6 and described previously herein. The slot-contour shape 72 of the slot 70 in the outer band 60 is created using known methods, such as by laser machining and electro discharge machining (EDM). In some applications, it is possible to combine step 515 and step 525 described above to perform the machining operations for creating the aperture 78 and slot 70.

The method 500 further comprises the optional step 530 of applying a bond preparation to the components to be brazed subsequently. For example, the optional bond preparation comprises applying a known surface preparation to the airfoil 50, the outer band 60 and the inner band 80. In the exemplary embodiment shown in FIG. 3, the bonding surface preparation comprises nickel plating of the airfoil 50, outer band 60 including the slot 70 and the inner band 80 using known materials, such as for example, AMS 2403, and using known plating methods.

The method 500 further comprises the step 535 of locating the airfoil 50 in the aperture 78. As described previously, a portion of the airfoil 50, such as the first end 57 (see FIGS. 3-5), extends through the aperture 78. A portion of the airfoil 50, such as the first end 57, is located in the aperture 78 such that there is a small gap between the airfoil and the outer band 60. Preferably, this gap ("braze gap") between the airfoil and the outer band is uniform and has a value between 0.000 inches and 0.010 inches. In some applications, the step 535 may comprise optionally tack welding some of the components forming the airfoil assembly 48. The airfoil 50 and the outer band 60 and the inner band 80 may be optionally tack welded in position prior to brazing using known welding methods, such as for example, resistance welding, spot welding, seam welding and projection welding.

The method 500 further comprises the step 540 of applying a brazing material in the areas of interface between the airfoil 50 and the outer band 60 and, if applicable, between the airfoil 50 and the inner band 80. A suitable braze alloy is selected using known methods, depending on the material compositions of the airfoil 50, outer band 60 and the inner band 80. In the exemplary embodiment shown in FIG. 3, the airfoil 50 and the outer band 60 are made from Inconel 718 and the inner band is made from Inconel 625. The braze material used is a commercially available braze alloy, AMS 4777.

The method 500 further comprises the step 545 of brazing the airfoil 50, outer band 60 and the inner band 80 to form the airfoil assembly 48. The components of the airfoil assembly 48 is conventionally fixtured so that they can be conventionally brazed together using known brazing materials such as AMS4777. During brazing, the assembly is heated using known methods. The brazing material is suitably melted and spread by capillary action within the braze gap between the airfoil 50 and the outer band 50 and between airfoil 50 and the inner band 80. During brazing, care is taken to keep the slot 70 substantially free of brazing material. This can be accomplished, for example, by suitably orienting the assembly such that braze material does not flow into the slot 70. Upon cooling of the assembly, the braze material solidifies and rigidly joins the airfoil 50 with the outer band 60 and the inner band 80 to form the airfoil assembly 48. In the exemplary embodiment shown in FIG. 3, the brazing operations are preferably performed in a vacuum furnace known in the art. After brazing is complete, the method 500 may further optionally comprise the step of heat treating the airfoil assembly 48 using known methods. For example, known age-heat treatment may be applied the airfoil assembly 48 to restore metallurgical properties.

As used herein, an element or step recited in the singular and proceeded with the word "a" or "an" should be understood as not excluding plural said elements or steps, unless such exclusion is explicitly recited. When introducing elements/components/steps etc. of designing and/or manufacturing airfoil assembly 48, vane sector 44 or compression system 90 described and/or illustrated herein, the articles "a", "an", "the" and "said" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc. Furthermore, references to "one embodiment" of the present invention are not intended to be interpreted as excluding the existence of additional embodiments that also incorporate the recited features.

Although the methods and articles such as vanes, outer bands, inner bands and vane segments described herein are described in the context of a compressor used in a turbine engine, it is understood that the vanes and vane segments and methods of their manufacture or repair described herein are not limited to compressors or turbine engines. The vanes and vane segments illustrated in the figures included herein are not limited to the specific embodiments described herein, but rather, these can be utilized independently and separately from other components described herein.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

What is claimed is:

1. An airfoil assembly comprising:
   an airfoil having a leading edge and a trailing edge;
   a band rigidly coupled to the airfoil along a portion of an interface between the band and the airfoil for providing at least a portion of support for the airfoil in the airfoil assembly; and
   a slot capable reducing stress in the airfoil wherein the slot is located in the band at the interface between the airfoil and the band near one of the leading edge and the trailing edge of the airfoil.

2. An airfoil assembly according to claim 1 wherein the slot is located near the trailing edge of the airfoil.

3. An airfoil assembly according to claim 2 wherein the slot has a slot-contour shape substantially corresponding to the airfoil-contour shape of the airfoil near the trailing edge.

4. An airfoil assembly according to claim 1 wherein the slot is located near the leading edge of the airfoil.

5. An airfoil assembly according to claim 4 wherein the slot has a slot-contour shape substantially corresponding to the airfoil-contour shape of the airfoil near the leading edge.

6. An airfoil assembly according to claim 1 wherein the slot extends through the thickness of the band.

7. An airfoil assembly according to claim 1 wherein the slot has a slot-contour shape that is substantially circular.

8. An airfoil assembly according to claim 7 wherein the slot has an offset with respect to a portion of the airfoil.

9. An airfoil assembly according to claim 1 wherein the airfoil is rigidly coupled to the band by brazing.

10. An airfoil assembly according to claim 1 wherein the airfoil is coupled to an outer band and an inner band.

11. An airfoil assembly according to claim 10 wherein the slot is located in the inner band.

12. An airfoil assembly according to claim 1 wherein the slot extends through the thickness of the band and has a slot-contour shape that facilitates a reduction of a leakage of a fluid through the slot.

13. An airfoil assembly according to claim 1 wherein the slot extends in a chordwise direction near a portion of the airfoil.

14. A compression system comprising:
   a stator assembly having a flow path for flowing a fluid there-through, wherein the stator assembly comprises a plurality of arcuate vane sectors arranged circumferentially around a longitudinal axis, each vane sector comprising an airfoil, an arcuate inner band and an arcuate outer band coupled to the airfoil, and a slot capable of reducing stress in the airfoil, the slot being located in the vane sector near a portion of the airfoil;

wherein the airfoil is rigidly joined to the vane sector along a portion of an interface between the airfoil and the vane sector; and wherein the slot is disposed at the interface where the airfoil is not rigidly joined to the vane sector.

15. A compression system according to claim 14 wherein the slot is located in the outer band near the trailing edge of the airfoil.

16. A compression system according to claim 15 wherein the slot has a slot-contour shape substantially corresponding to the airfoil-contour shape of the airfoil 50 near the trailing edge.

17. A compression system according to claim 14 wherein the slot is located in the outer band near the leading edge of the airfoil.

18. A compression system according to claim 17 wherein the slot has a slot-contour shape substantially corresponding to the airfoil-contour shape of the airfoil near the leading edge.

19. A compression system according to claim 14 wherein the slot extends through the thickness of the outer band.

20. A compression system according to claim 19 wherein the slot has a slot-contour shape that facilitates a reduction of a leakage of a fluid through the slot.

21. A compression system according to claim 14 wherein the slot is located in the inner band.

22. A compression system according to claim 14 wherein the slot extends in a chordwise direction near a portion of the airfoil.

23. A compression system comprising:

a stator assembly having a flow path for flowing a fluid there-through, wherein the stator assembly comprises a plurality of arcuate vane sectors arranged circumferentially around a longitudinal axis, each vane sector comprising an airfoil, an arcuate inner band and an arcuate outer band coupled to the airfoil, and a slot capable of reducing stress in the airfoil, the slot being located in the vane sector near a portion of the airfoil, and wherein the slot has a slot-contour shape that is substantially circular.

* * * * *